INVENTOR
ROYAL F. LEE

Watson, Cole, Grindle & Watson
ATTORNEYS

April 19, 1960

R. F. LEE 2,933,149

COLLAPSIBLE STAIRWAY INSTALLATIONS FOR
AIRCRAFT AND OTHER VEHICLES

Filed June 19, 1956

5 Sheets-Sheet 2

INVENTOR
ROYAL F. LEE

By

Watson, Cole, Grindle & Watson
ATTORNEYS

April 19, 1960  R. F. LEE  2,933,149
COLLAPSIBLE STAIRWAY INSTALLATIONS FOR
AIRCRAFT AND OTHER VEHICLES
Filed June 19, 1956  5 Sheets-Sheet 5

INVENTOR
ROYAL F. LEE
By
Watson, Cole, Grindle & Watson
ATTORNEYS

United States Patent Office 2,933,149
Patented Apr. 19, 1960

2,933,149

COLLAPSIBLE STAIRWAY INSTALLATIONS FOR AIRCRAFT AND OTHER VEHICLES

Royal Frederick Lee, Walton-on-Thames, England, assignor to Vickers-Armstrongs (Aircraft) Limited, London, England Application June 19, 1956, Serial No. 592,306

Claims priority, application Great Britain June 22, 1955

5 Claims. (Cl. 182—78)

The invention has for its object to provide an improved constructional arrangement of collapsible stairway for installation in vehicles, e.g. aircraft, in which the compartment containing crew, passengers, or other personnel, is so high when the aircraft or the like is on the ground that a staircase is requisite for convenient access to such compartment from the ground. The necessity for such provision is experienced in the case of aircraft where landings are made at aerodromes or airports where portable external staircases are not available. A further advantage of a staircase which, when collapsed, is housed in the aircraft, arises from the considerable saving of time in providing access to and from the aircraft, as compared with the case when a portable staircase has to be brought to the aircraft whenever required. It is also desirable that the arrangement shall be such that the staircase is operatively connected with the door of the aircraft fuselage (or the like) in such manner that the operations of opening the door and extending the staircase, and of retracting the staircase in collapsed form and closing the door, are performed automatically in the appropriate order.

According to the invention, a collapsible staircase in accordance with the invention comprises an assembly of stringers and steps arranged in articulated sections capable of collapsing by folding upon each other about spaced transverse axes, means for mounting the inner section stringers on fixed pivots in the cabin or the like, a linkage connecting the relatively movable parts of the staircase, means in the cabin or the like for controlling such linkage so that on the outward pivotal movement of the inner stringers said linkage is actuated to unfold the sections (and vice versa), and a connection between the staircase and the door such that the latter is automatically opened by initiating the outward or extending movement of the former and automatically closed on completion of the inward movement of the staircase.

Figure 1:
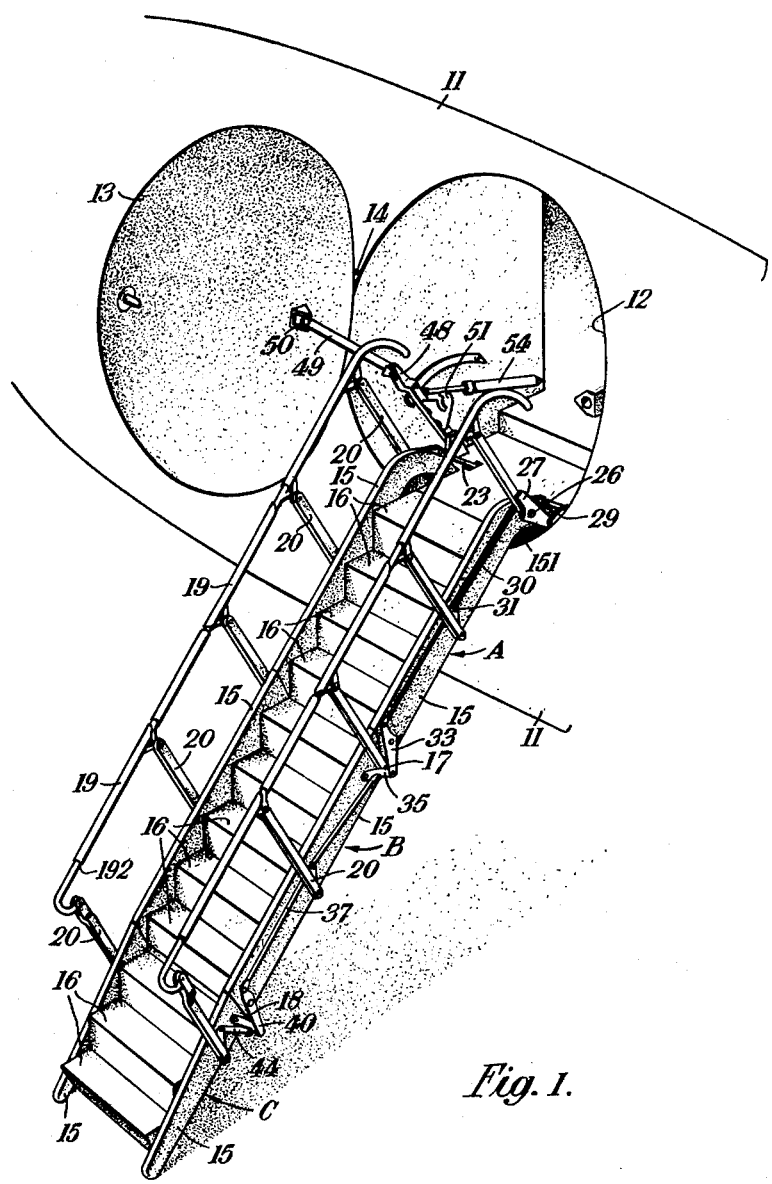
Figure 2:
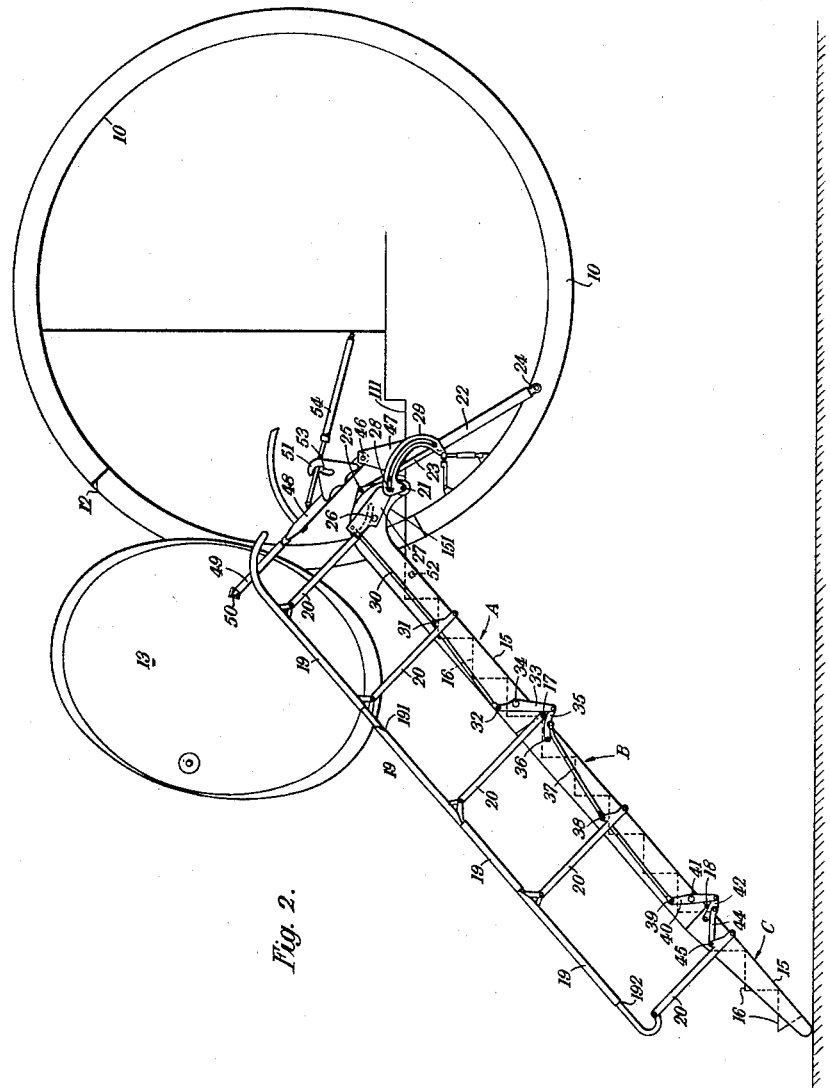
Figure 3:
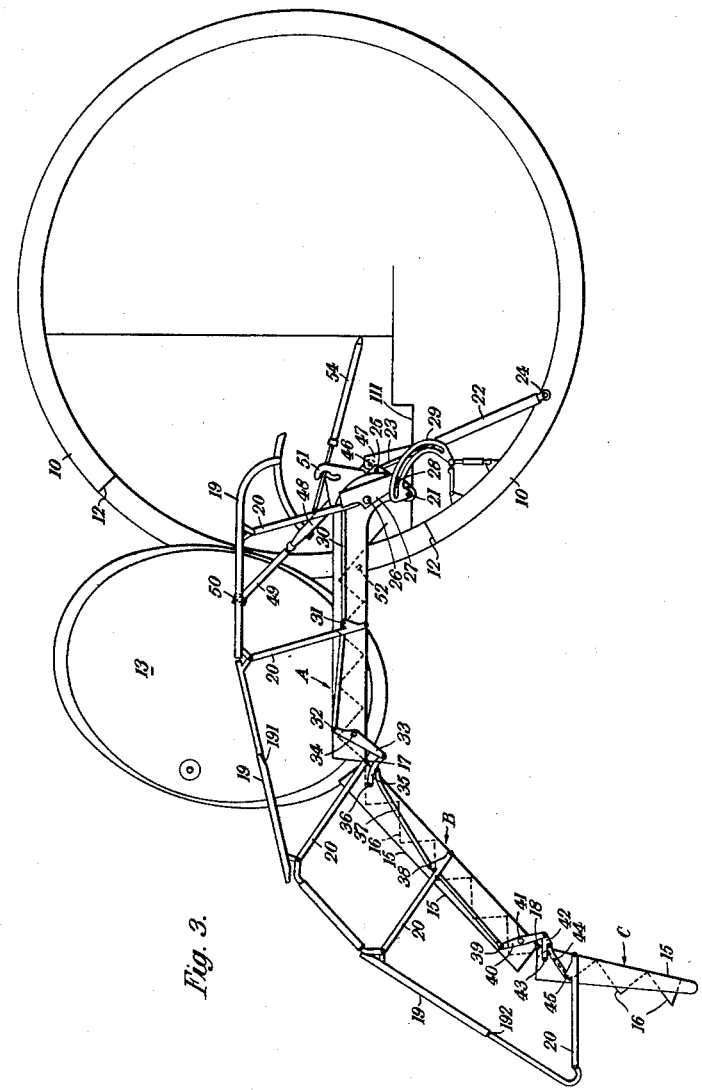
Figure 4:
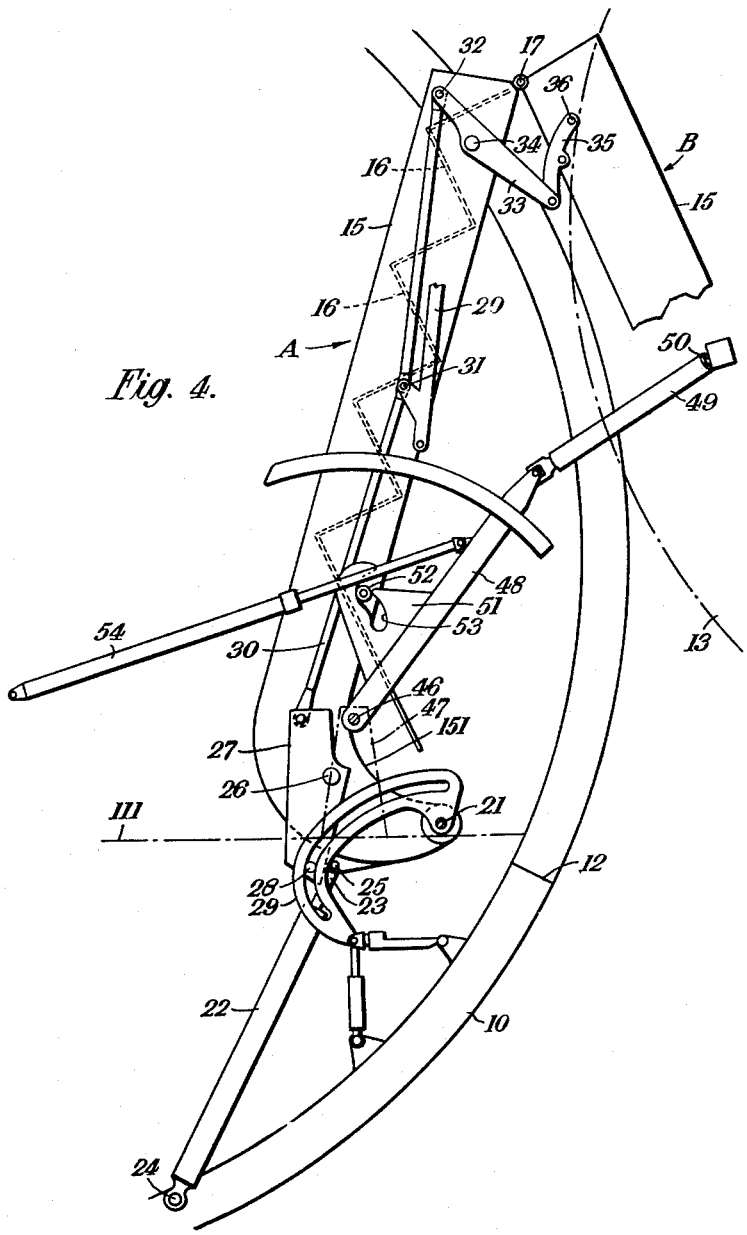
Figure 5:
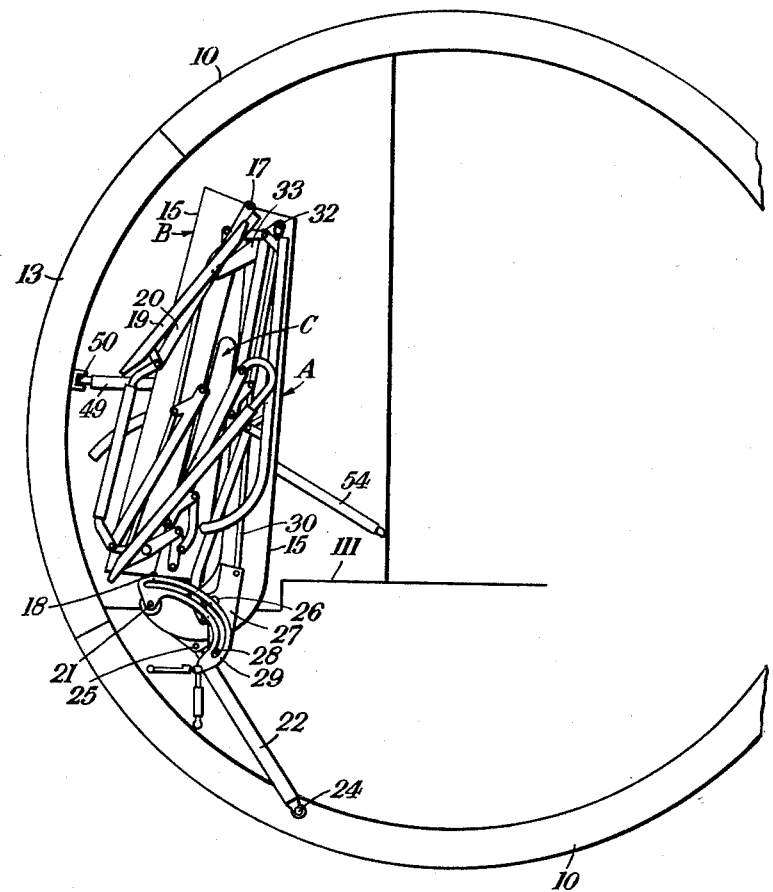

The manner in which the invention may be carried into effect is hereinafter described with reference to the accompanying diagrammatic drawings, which illustrate a collapsible staircase for the cabin of a passenger-carrying aircraft. Figs. 1 and 2 of the drawing are respectively a perspective view and a side elevation of the staircase in the extended position, Fig. 3 is a side elevation showing the staircase in a partially folded position, Fig. 4 is a fragmentary view drawn to a larger scale, as seen from the side opposite to Figs. 1 and 2, illustrating the mechanism by which the door is connected to the staircase, and Fig. 5 is a side elevation of the staircase in the completely retracted condition.

In the drawings the reference numeral 10 indicates one of the transverse frames of the aircraft cabin, the wall of which is seen in Fig. 1 at 11. The door aperture, marked 12, is adapted to be closed by a door 13 suspended on hinges 14, 14, so as to swing open in an outward direction.

The staircase itself comprises the conventional stringers 15, 15, and steps 16, 16, but it is divided transversely into three sections, viz. the inner-section A, the intermediate section B and the top-section C, which are hinged together for relative folding movement about pivots 17 and 18. A composite collapsible hand-rail 19, carried by balusters 20 which are pivotally mounted on the stringers 15, is provided at each side of the staircase; as will hereinafter be described, each section A, B or C of the staircase constitutes an integral frame together with the portions of the hand-rail associated therewith.

The inner section A of the staircase (i.e. the section thereof which occupies the position at the top of the staircase when the same is extended) is pivotally mounted inside the cabin. For this purpose the inner ends of the stringers 15 of said inner section A are cranked at 151 and an offset point of each section is mounted rotatably upon a fixed pivot pin 21 located within the cabin at a point just below the doorway 12. A hydraulic jack 22, 23 is positioned in the cabin, conveniently beneath the floor 111, the jack cylinder 22 being pivotally connected at 24 to the frame 10 and the outer end of the ram 23 being pivotally linked to another offset point 25 on the cranked portion 151 of the inner stringer-section 15.

Pivotally mounted at 26 upon the outer side of each stringer 15 of the section A is a lever 27 one end of which carries a cam-follower 28 arranged to cooperate with a fixed arcuate cam-track 29. At the other end each lever 27 is pivoted to a jointed-link 30 which is hingedly connected at 31 to the second baluster 20 of section A and at 32 to a reversing lever 33 which is pivotally mounted at 34 on the side of the stringer. The other end of the reversing lever 33 is connected by a link 35 to a fixed point 36 of the intermediate section B.

A drag-link 37 connects said link 35 and the second baluster 20 of section B at 38, an extension of the link 37 being connected at 39 to a second reversing-lever 40 which is pivotally mounted at 41 on the side of the stringer. The other end of the lever 40 is connected by a link 42 to a fixed part 43 on the outer section C, and a short link 44 provides a pivotal connection between the link 42 and the baluster 20 of section C at 45.

The arrangement is such that when the jack 22, 23 is energised, the staircase being in the retracted condition, as shown in Fig. 5, the ram 23 pushes the inner sections A of the stringers 15 outwardly about the pivots 21. As the stringers rotate, the cam-followers 28 cooperate with the cam-tracks 29 to actuate the levers 27, moving them in a clockwise direction as viewed in Figs. 2 and 3, the effect whereof is to bring about angular movements in the same sense in the reversing levers 33 and 40 and so to unfold the staircase until it eventually reaches the position shown in Fig. 2, having passed successively through the positions shown in Fig. 4 and Fig. 3. A reverse actuation of the jacks 22, 30 operate in the opposite sense to retract the staircase to the folded position shown in Fig. 5.

The handrails 19 are erected and collapsed synchronously with the unfolding and folding operations of the staircase. One pair of balusters of each section, i.e. the second balusters of sections A and B, and the balusters of section C, is actuated by the linkage already described; the first balusters of sections A and B are linked through the handrails to the second balusters, so that they constitute a parallel linkage therewith, and the lengths of handrail which extend between the sections A and B, and B and C, are made telescopic at 191, 192.

The unfolding movements of the staircase and handrail are so timed, by suitable choice of shape of the cam-track 29 that they are completed just before the foot of the outer section C reaches ground level. Conversely, the return or rectractile movements are timed to be completed just as the staircase reaches the position shown in Fig. 5.

An offset pivot 46 on a bracket 47 fixed to the cabin floor is connected by a toggle link 48, 49 to a fixed pivot 50 on the inner face of the door 13, and a slotted plate 51 which is fixed to the link 48 is arranged, when the staircase is retracted, to engage a detent 52 which projects from the side of one of the stringers 15. The arrangement is such that during the first part of the extending operation of the staircase, the engagement of the detent 52 with said plate 51 causes the movement of the stringer to be imparted through the toggle link 48, 49 to the door 13, so that the latter commences to open at the initiation of the extending operation of the staircase. When the parts pass the position shown in Fig. 4, the detent 52 reaches the mouth of the slot 53, so that the plate 51 is thus freed from the restraint of the detent 52, the spring-pressed jack 54 comes into operation, pushing the linkage 48, 49 forward until it is braced over top-dead-centre and the door 13 is held fully open to permit the unobstructed outward movement of the staircase. When the staircase is retracted, the door 13 remains fully open until the parts reach the position in which the detent 52 engages the slot 53 of the plate 51, when the linkage 48, 49 is withdrawn to close the door as the now-folded staircase passes within the cabin.

The mechanism for operating the jack 22, 23 is preferably such that when the mechanism is released the power to the jack is automatically cut off. In this condition it is possible to push the staircase outwardly by hand, thereby opening the door in the event of a failure of the power-supply.

What I claim as my invention and desire to secure by Letters Patent is:

1. A collapsible staircase comprising a support defining a door opening, a rigid inner staircase section pivotally connected at one end to said support for vertical swinging movement into and from said opening, a second rigid staircase section pivoted to the free end of said inner section for relative angular movement into and from an erected position of relative alignment with said inner section, linkage means interconnecting the respective sections and movable relative to said pivoted end of the inner section for causing relative angular movement between said sections, said linkage means including a control lever swingably fulcrumed on said inner section for controlling the movement of said linkage means, a cam fixed on said support and having a cam surface eccentric to said pivotal connection of the inner section, and a follower on said lever operatively engaging said surface for swinging said lever relative to the inner section as an incident to swinging movement of said inner section, in combination with a door hinged to said support and arranged to be opened and closed with respect to said opening incident to movement of said inner staircase section, including a toggle linkage interconnected between said door and support, a detent fixed on said inner staircase section eccentrically to the pivotal connection of said inner staircase section, a plate carried by the said toggle linkage, said plate being formed with a cam slot opening through one edge thereof for reception of and cooperation with said detent to impart a swinging movement to said door incident to swinging of said inner section, the slot of said plate and said detent being so arranged that said detent will move into and out of said slot to disengage said detent from the slot at a point medially of the range of swinging movement of said inner staircase section, and resilient means interconnected between said support and said toggle linkage and biasing said toggle linkage in a direction to open said door incident to release of the detent from said slot.

2. A staircase as claimed in claim 1, having a collapsible handrail operatively connected to said linkage to be erected when the staircase is extended and collapsed when the staircase is retracted to the folded position, said handrail comprising balusters pivotally connected to said respective staircase sections and means connecting said respective balusters to said linkage for erection and collapsing coincident with the erection and collapsing of said stairway, said balusters being swingable about their pivotal connections to said sections between collapsed portions generally parallel to their said sections and erected positions substantially normally to said sections.

3. A collapsible staircase comprising a support defining a door opening, a rigid inner staircase section pivotally connected at its inner end to said support for vertical swinging movement into and from said opening, a second rigid staircase section pivoted to the outer end of said inner section for relative angular movement into and from an erected position of relative alignment with said inner section, linkage means interconnecting the respective sections and movable relative to said pivotally connected inner end of the inner section for causing relative angular movement between said sections, said linkage means including a control lever swingably fulcrumed on said inner section for controlling the movement of said linkage means, and means interconnecting said control lever to the said support for swinging said lever relative to the inner section as an incident to the swinging movement of said inner section, said linkage means further including a reversing lever medially pivoted on the outer end portion of said inner section, a rigid link interconnecting one end of said reversing lever to said control lever, and means including a second rigid link interconnecting the opposite end of said reversing lever to said second section at a location eccentric to the pivotal connection between said inner and second sections.

4. A collapsible staircase defined in claim 3, including a third staircase section pivotally connected to the outer end of said second section, a second reversing lever medially pivoted on said second section, a rigid link member connecting one end of said second reversing lever to said first-mentioned reversing lever to transmit movement between said levers, and a third rigid link interconnecting the other end of said second reversing lever to said third stairway section at a location eccentric to the pivotal connection between said second and third sections.

5. A collapsible staircase as defined in claim 3, including a plurality of balusters pivotally connected at their lower ends to their respective sections, relatively telescopically interconnected handrails pivotally supported at the free ends of said respective balusters, and means interconnecting said balusters to said linkage means for erection or collapsing of said balusters and handrails incident to erection or collapsing of said staircase.

References Cited in the file of this patent

UNITED STATES PATENTS

| | | |
|---|---|---|
| 2,531,263 | Fink et al. | Nov. 21, 1950 |
| 2,551,345 | Scott | May 1, 1951 |
| 2,764,422 | McDonald | Sept. 25, 1956 |

FOREIGN PATENTS

| | | |
|---|---|---|
| 181,741 | Switzerland | Jan. 15, 1936 |
| 475,929 | France | Apr. 6, 1915 |
| 641,987 | Great Britain | Aug. 23, 1950 |